Nov. 12, 1968  T. V. REINAUER  3,410,056
METHOD OF CLEANING FILTER MEDIA
Filed Feb. 9, 1968
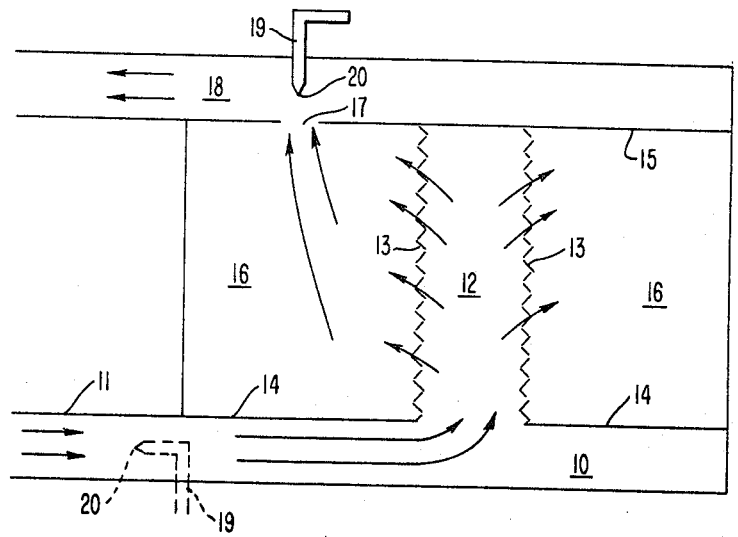
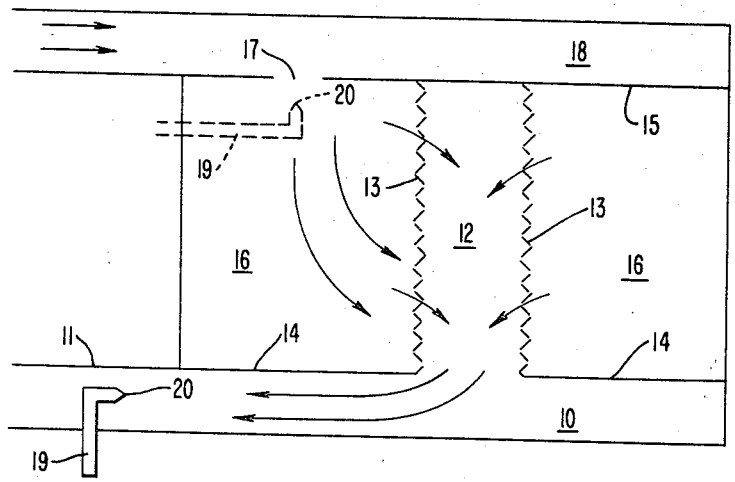
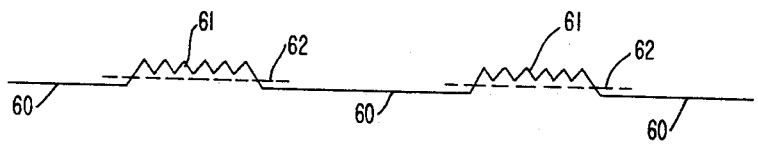
INVENTOR.
THOMAS V. REINAUER
BY
ATTORNEY

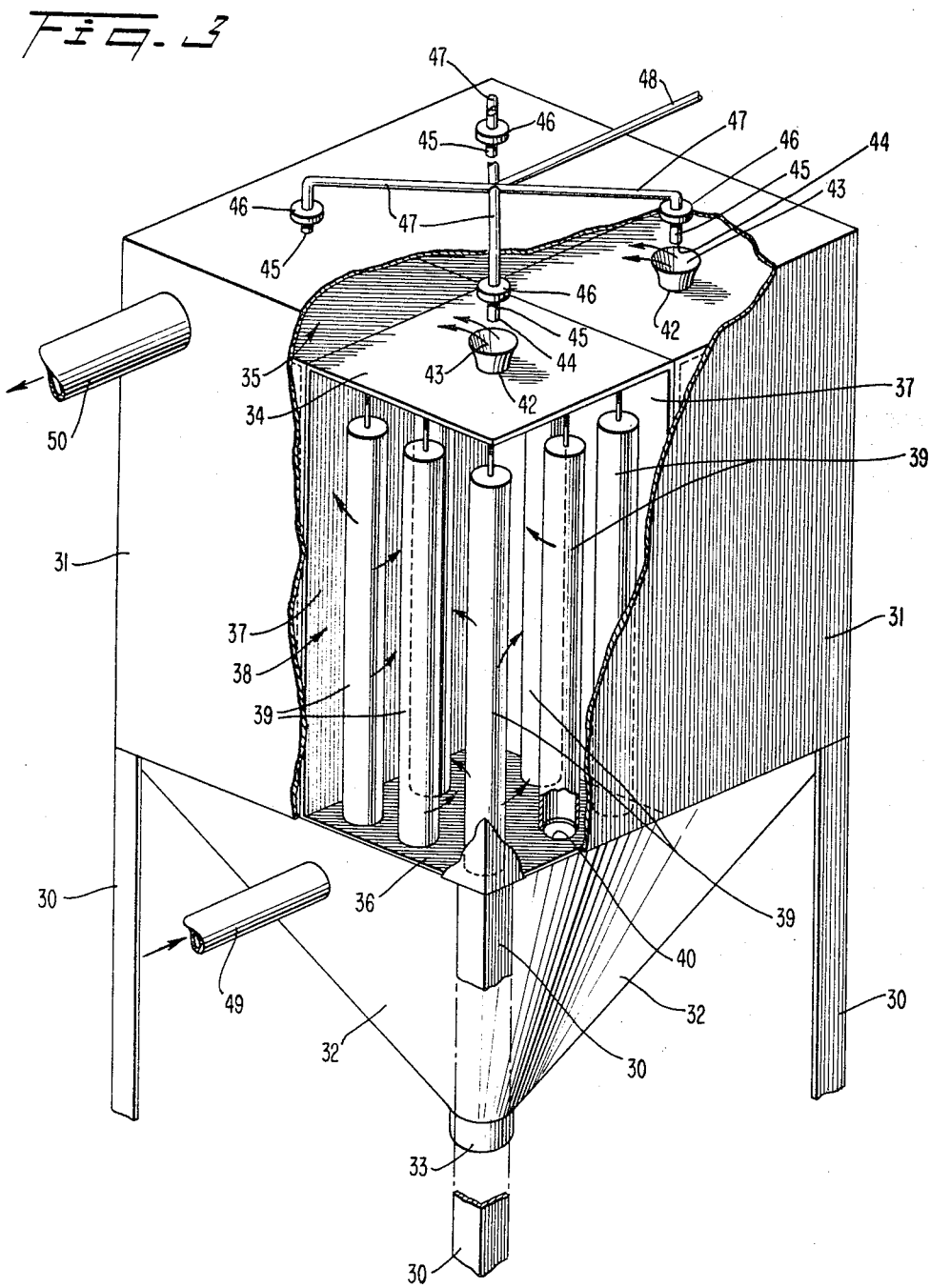

United States Patent Office 3,410,056
Patented Nov. 12, 1968

3,410,056
METHOD OF CLEANING FILTER MEDIA
Thomas V. Reinauer, Summit, N.J., assignor to Slick Industrial Company, Summit, N.J., a corporation of Delaware
Continuation-in-part of application Ser. No. 345,996, Feb. 19, 1964. This application Feb. 9, 1968, Ser. No. 704,426
4 Claims. (Cl. 55—96)

ABSTRACT OF THE DISCLOSURE

A method for manipulating pulses of high energy gas to clean a non-rigid filter media in a dust collection system comprising repetitively releasing over a cross-sectional area of some part of the path taken by a normal filtering flow of gas and in a direction generally opposite to the direction of the normal filtering flow separated discrete series of gas pulses, each series being composed of not less than four and not more than eight pulses and a succeeding pulse is released before the gas movement effect of a preceding pulse has been dissipated so that during said series and until the effect of the last pulse of said series has been dissipated the condition as to gas movement in the system is different from the condition immediately preceding the initiation of said series and the energy of each pulse of each series being such as to cause a momentary flow of gas in said system in a direction opposite to the normal filtering flow direction of gas.

---

This invention relates to a method of maintenance of acceptable permeability of non-rigid filter media in dust collection systems by the manipulation of pulses of relatively high energy gas, i.e., air or any acceptable gaseous fluid, over a cross-sectional area of the path of normal filtering flow through said system of the gas from which the dust is collected by the filtering effect of the media.

This application is a continuation-in-part of my application Ser. No. 345,996, filed Feb. 19, 1964 now Patent No. 3,368,328, issued Feb. 13, 1968.

The invention is concerned with dust collection systems of the type which rely, in whole or in part, upon a porous or gas permeable medium called a filter medium, for the removal of solid particulate matter from a stream of gas. Within the ambit of such systems, the method of the invention is entirely concerned, as will later more fully appear, with systems employing non-rigid filter media such as fabric, which may be of any fibrous material, either natural or synthetic, spun into yarn and then woven or impacted, bonded or otherwise formed into a felt. In these types of dust collectors, the duct bearing gas is passed unidirectionally through the filter media in such manner that the dust particles are retained on the upstream, or dirty, side of the medium through which the cleaned gas passes. As is evident, and well known, at least a portion of the particulate solids collecting on the upstream side, and in, the filter medium during the dust collection process must be dislodged therefrom, from time to time, in order to maintain the permeability of the filter medium at an acceptable level, i.e. at a level at which, under the conditions of design and use, the dust collection system is capable of performing its function at the gas flow rate desired. Basically, dust collection systems are designed to either provide essentially continuous, uninterrupted gas flow to and through the system, in which case the dislodging of dust from the filter must be performed during this continuous operation, or to provide a programmed usually short-term, stoppage of the gas stream during which stoppage the dislodging of the dust may be performed. The methods of the present invention are usefully performed in connection with either type of these systems.

Known techniques of dislodging dust from the surfaces of filter media in dust collector systems may be broadly divided between those using some type of reverse flow, those which rely on shaking, collapse or other displacement or physical manipulation of the filter media and those which combine these techniques. The present invention is akin, in its over-all approach, to that technique of inducing reverse air flow and, where used with non-rigid media displacement of the filter media, which is sometimes called pulse-jet reverse flow cleaning. In such a technique, the portion of the dust collection system to be cleaned during operation is not mechanically shut off or isolated from the remainder of the system prior to cleaning. Instead, an abrupt burst of high energy gas is released, counter-current to normal filter flow, over a cross-sectional area of the opening of a filter chamber, thereby at once stopping and reversing normal filter flow and causing an abrupt pressure rise in the downstream face of the filter media. The method of the present invention, as will appear, is capable of being produced by known apparatus, such as that type of apparatus used in these known pulse-jet techniques.

The method of this invention is an improvement in the use of the pulse-jet principle in which the emphasis is placed in dislodging by filter media displacement rather than by reverse flow. It is, therefore, confined in use to dust collection systems employing non-rigid filter media and preferably those of fabric as above defined. In its broad essentials, the method of this invention dislodges the dust built up in filter media in a dust collection system in the following way. At least two series of pulses of high energy gas, each series being separated from the preceding series by a time interval of at least greater length than the duration, or time of operation, of the preceding series, are released over a cross-sectional area of the path of normal filtering flow of gas through the system, or a part thereof. Each of these series of pulses, which may be as many as desired, is comprised of at least four and preferably not greater than eight pulses and is further characterized by the fact that each succeeding pulse of a series is released before the gas movement effect of a preceding pulse has been entirely dissipated thereby producing the general result, during any such series, that until the effect of the last pulse of a series has been dissipated, the condition of gas movement in the system is different from the condition existing immediately preceding the initiation of that series. The energy of the pulses required for the practice of this invention is a relative matter. In any event, it is such as to cause a momentary flow of gas in said system in a direction opposite the normal flow of gas in the system. When the method of this invention is practiced in a system which is operated with programmed stoppages of normal filtering flow during which cleaning is effected, the pulses may be of any substantial energy content since the non-flowing gas residual in the dust collection system during such a stoppage has no real energy. Preferably, in the practice of this invention, the energy of a pulse should, in any event, exceed for good results the energy of air compressed to five pounds per square inch when the non-flowing gas residual in the system has no real energy. Where the term "pulse" is used herein and in the appended claims, it denotes a gas burst of brief duration, such as is commonly employed in pulse jet reverse cleaning practices. Usually, the duration of such a burst is in the order of .1 to .2 second and preferably not over .5 second, since a longer duration may often not serve a useful purpose and, in such case, would represent a mere waste of gas as well as a longer cleaning cycle.

More specific descriptions of the method of the invention and its operation, are best had with reference to the drawings in which various specific applications of the method are schematically indicated.

Referring to the drawings:

FIGURE 1 is a general schematic view in cross-sectional elevation of the essentials of apparatus to which the method of this invention may be applied;

FIGURE 2 is another general schematic view, in cross-sectional elevation of the essentials of apparatus to which the method of this invention may be applied;

FIGURE 3 is a view, in elevation, with a portion being shown in partial cross-section, of a device presently preferred for the application of the method of this invention; depictions illustrating, as herein explained, the method of the invention; and FIGURE 4 is a line depiction indicating a practice of the invention.

As generally schematically depicted in FIGURE 1, a dust collection system of the type herein contemplated comprises, broadly, a feed area 10 into which, as through extension or conduit 11, is led the gas bearing the entrained solids to be separated. The feed area 10 leads to some sort of filter chamber or area 12 bounded, at least in part, by fabric filter media wall 13, probably tubular in shape and supported by any suitable means in the dividers 14, 15 which, with media wall 13, define an exhaust area 16 which communicates, through opening 17 in the divider 15, with a passage 18 through which the cleaned gas is removed from the system. A fan, or other prime mover, not shown, causes the gas to move in its normal filtering flow in the direction indicated by the arrows in FIGURE 1, the path of such normal flow being from 11 through 10 into 12 and thence through 13 into 16 and from 16 through 17 into 18, and thence, from the system. Were it not for the necessity of periodically displacing from the upstream face of media 13 solids or dust collected thereon the desired rate of flow of the gas through said path could be maintained indefinitely. To effect such displacement it is only necessary to add to the schematically indicated basic components of the dust collection system, a pulsing unit, such as indicated in FIGURE 1 by the partial showing of pipe 19 in full line, and in dotted line at an alternative position. Said pipe 19 is connected to a source of high energy cleaning gas (not shown) through a conventional quick acting valve (not shown) the arrangement being such that there may be released at the end 20 of pipe 19, and in any sequential arrangement desired, pulses, of the high energy gas. In the practice of the invention, the point of release of the pulse, the end 20 of pipe 19, is positioned to deliver the high energy pulse oppositely to the direction of normal filtering flow whether or not such flow is actually in progress, and entirely across a cross-sectional area of the path of said flow. In the specific practical apparatus, of which FIGURE 1 is only a schematic depiction, the practical possibilities of location of said point of release are a matter of the geometry of the flow path but several alternative locations will usually present themselves. In the context of the showing of FIGURE 1, the point of release 20 is shown as located above the aperture 17 and, of course, at sufficient distance therefrom as to insure that the pulse-jet issuing at point 20 will, as it expands in its environment, generate a cone of relatively high energy gas which extends across the entire area of said aperture. But, as alternatively shown in FIGURE 1 in dotted line, the pipe 19 could be located so that the pulse-jets released from it generate a flow of high energy gas across the cross-sectional area of that portion of the path of normal flow which is defined by the extension 11.

In FIGURE 2 is again schematically illustrated, the same basic elements of an apparatus as are illustrated in FIGURE 1. Here, however, the flow of dirty gas has been reversed so that the solids removed from the gas are trapped and held on the opposite side of the filter medium 13, the area 16 becoming the feed area, the area 10 becoming the exhaust area and the path of normal filtering flow being from 18 through 17 into 16 and thence through 13 into 12, thence into area 10 and finally through extension 11. In such a case, the location of the point of release of the pulse-jet, as evidenced in FIGURE 2 by the end 20 of pipe 19, is in accordance with the principles stated in respect of the description of the device of FIGURE 1 with the result that the end 20 of pipe 19 is, in FIGURE 2, pointed oppositely directionally to that shown in FIGURE 1.

The schematic showing of FIGURES 1 and 2 are merely explanatory in nature. In practice, a dust collection system of the type thus indicated may take various specific forms. A form which is preferred in the practice of this invention is shown in FIGURE 3.

The device of FIGURE 3 is a packaged self-contained dust collection system designed to rest on supports 30. It includes a main housing 31 to which is appended walls defining a direct collection chamber 32 which terminates in an airlock valve 33 which may be continuously, or periodically, operated to remove dirt by gravity flow from chamber 32. Within the main housing 31 is provided a horizontal dividing wall 34 which defines with housing 31 and housing floor 36 an upper clean gas chamber 35. The floor 36 of the main housing 31 also defines the upper wall of the dirt collection chamber 32. The general area defined by the main housing 31 by floor 36 and by the dividing wall 34 is partitioned into four approximately equal and separate areas by the vertical partitions 37. In FIGURE 3, one such area, generally indicated as 38, is shown by breaking away of a portion of the wall of the housing 31. It will be understood that three other such areas exist. In each such area are suspended a number of tubes, or socks 39 made of fabric filter media, each possessing an open end or mouth 40 which is fastened over an opening in the floor 36. The closed end of each tube 39 is fastened to the horizontal partition 34 by the rods, springs or wires 41. At the top of each of the four areas, as for instance the area 38, is provided an opening through the horizontal partition wall 34, one such opening being shown at 42 as being provided with a venturi shaped or flared portion 43. Above each of the four openings 42 is positioned a point of release 44 of a pulse jet, each said point of release 44 being a suitably shaped end of a pipe extension 45 from a valve mechanism 46 through which high energy gas may be fed through pipes 47 from a gas main 48 attached to a source of high energy gas, not shown. Electrical controls of usual circuitry, but not here shown, are provided to operate valves 46 in any desired manner, thereby allowing the operator to program a release of the desired series of such pulses at any of the points of release 44 provided above the opening 42 of each area 38 within the main housing 31. Gas to be filtered by the system shown in FIGURE 3 is brought to said system through pipe 49 which delivers the gas into the dirt collection chamber 32. An exhaust duct 50 leads from the clean gas chamber above horizontal partition 34 and delivers the cleaned gas to any desired point. The normal path of filtering flow in the device of FIGURE 3 is thus through pipe 49 into the dirt collection area 32 and thence through the mouths 40 of the tubes 39 and from such tubes into each of the four chambers into which the housing is divided, thence, from each such chamber through opening 42 into the clean air collection chamber above partition 34 and thence from the system through exhaust duct 50. By reason of the path and direction of this normal filtering flow, as indicated by flow arrows, the solids removed from the dirty gas are deposited in the inner surfaces of the filter media tubes 39 and said solids will, if dislodged therefrom, fall downwardly into the dust or solids collection chamber 32 from whence, from time to time, the solids may be removed through valve 33.

Turning now to the preferred practice of this invention in the context of the preferred type of dust collection system, as illustrated in FIGURE 3, the operator preferably cleans each of the four chambers 38 in a pre-determined sequence by releasing first one, and then at least another, or several more, series of pulses from the point of release 44 which is positioned to deliver high energy pulses counter current the direction of normal filtering flow and over the cross-sectional area of the opening 42 over which said point of release is positioned. While each of said series of pulses will consist of at least four pulses, I prefer a larger number of pulses in each series, for example, five or six. The controls of the release valve 46 are so manipulated, or fashioned, that each succeeding pulse of a series is released before the gas movement effect of the preceding pulse has been dissipated thereby maintaining in the chamber 38 a gas movement throughout the series which is different, directionally and/or in energy content from that in existence at the initiation of the series. The operator, having caused such a series of pulses to be delivered from the point of release 44 then waits for a period of time at least of greater length than the preceding series before releasing another series of pulses. The operation just described may be pictorially illustrated as by the line drawing of FIGURE 4 in which the levels of line 60 may be taken as expressing a condition of normal filtering flow prior to the release of each series of pulses 61, the number of said pulses in the series being indicated by the number of peaks in lines 61. During the pulsing action there is, in accordance with this invention, no return to the condition preceding the pulsing. This is pictorially indicated by the dotted lines 62 in FIGURE 4 which it will be noted are displaced from lines 61 merely to indicate a different condition other than the exact nature of that condition.

In its simple aspects, the above denotes emission of a succeeding pulse before resumption of the normal filter flow condition. It is believed that in most, if not all cases, such pulse release will also be effected before the filter fabric resumes its normal physical position assumed during normal filter flow conditions. As a preferred mode of operation the pulse duration and the interval between pulses is chosen to effect a progressive degree of displacement and deformation of the filter fabric. That is to say the duration between succeeding pulses is made sufficiently short so as to preclude return of the filter fabric to the position it had before being subjected to the displacement effect of the preceding pulse, thereby effecting a progress in degree of net displacement from its normal flow condition to a deformed condition during its exposure to a series of pulses.

The method of this invention may be applied to effect all of the desired cleaning or it may be operated in conjunction with other methods of cleaning such as the known pulse jet method, where single cleaning pulses are released at intervals.

In the preferred practice of my invention, I prefer to release the series of cleaning gas pulses on the clean air side of the system, thereby not only minimizing any chance of clogging of the pulse release nozzle or nozzles, but also achieving an additive effect of pulse gas and gas induced by it which is not achieved when the gas pulses are released on the dirty air side of the system.

In the practice of my invention experience has indicated that preferentially better results are obtained when the chamber into which the pulses are emitted, whether on the clean or dirty air side, is made to be minimal volume commensurate with the associated design parameters determined by the over-all size of the system, the dimensioning of the adjoining component elements and the intended operating criteria. By way of further example, preferentially better results have been achieved by the use of at least four but not greater than eight pulses in each series and with the use of from five to six pulses in each series apparently providing optimized results. By way of illustrative example, when operating under standardized test conditions of a substantially constant pressure drop of about 3.5 inches of water and with a grain load of about six grains per cubic foot with micronized talc as a test dust, air flows in the vicinity of two cubic feet minute per square foot of filter media surface were obtained using a series of six pulses of short duration (for example, in the order of .15 sec.) as compared to air flows in the vicinity of 1.35 cubic feet per minute per square foot of media when using a single pulse of substantially equal energy content per unit time.

Experience to date has also indicated that the described mode of operation provides preferentially better results on fumes or other dusts made up of particles of extremely small size, say of a maximum size of 1 micron or less.

The advantages of the method of the present invention over other known methods of shaking, collapse or displacement of non-rigid filter media to effect cleaning of the media include simplified erection in the plant, lack of internal moving parts and a shaking action effective over the entire length of a bag-type filter, the latter result being difficult to effect by shaking actions caused by mechanical type shakers. Advantages also accrue in savings in cost of a system designed to be cleaned by the method of this invention as compared to a system of equal capacity, utilizing the same media, designed to be cleaned by mechanical shaking, said savings being the result of elimination of shaker mechanism, and drives, dampers, or other compartment isolators, and drives for such dampers or isolators and the like.

The specific illustrations of the application of the method of this invention have been cited by way of example and not with intention of limiting the invention thereto. Within the scope of the appended claims the practice of the method of the invention may take various specific forms.

I claim:

1. In a method of manipulating pulses of high energy gas to effect improvement in permeability of non-rigid filter media in dust collection systems wherein during said dust collection the gas from which the dust is collected moves in a normal filtering flow through a system defined path which includes entry into and exit from a non-rigid filter medium which retains on its upstream side at least a portion of the collected dust, the improvement of:

repetitively releasing over a cross-sectional area of some part of the path taken by a normal filtering flow of gas and in a direction generally opposite the direction taken by such a normal flow separated discrete series of gas pulses, each said series being composed of not less than four and not greater than eight pulses and being further characterized by the fact that a succeeding pulse is released before the gas movement effect of a preceding pulse has been dissipated so that during said series and until the effect of the last pulse of said series has been dissipated the condition as to gas movement in said system is different from the condition immediately preceding the initiation of said series, the energy of each pulse of each series being such as to cause a momentary flow of gas in said system in a direction opposite the normal flow of gas through said path.

2. The method of claim 1 characterized by the fact that the release of said pulses takes place during a period when filtering flow has ceased.

3. The method of claim 1 characterized by the fact that each of said series of pulses is composed of not less than five and no more than six pulses.

4. The method of claim 1 characterized by the fact that each of said series of pulses subjects the filter madia to a progressively increasing degree of displacement during the course thereof.

(References on following page)

References Cited

UNITED STATES PATENTS

| | | | |
|---|---|---|---|
| 1,157,131 | 10/1915 | Sutton | 55—96 |
| 2,712,387 | 7/1955 | Young | 210—412 |
| 3,178,868 | 4/1965 | Gibby | 55—96 |
| 3,217,468 | 11/1965 | O'Dell | 55—96 |
| 3,256,679 | 6/1966 | Snyder | 55—302 |

FOREIGN PATENTS 225,059  10/1959  Australia.

HARRY B. THORNTON, *Primary Examiner.*

D. TALBERT, *Assistant Examiner.*